UNITED STATES PATENT OFFICE.

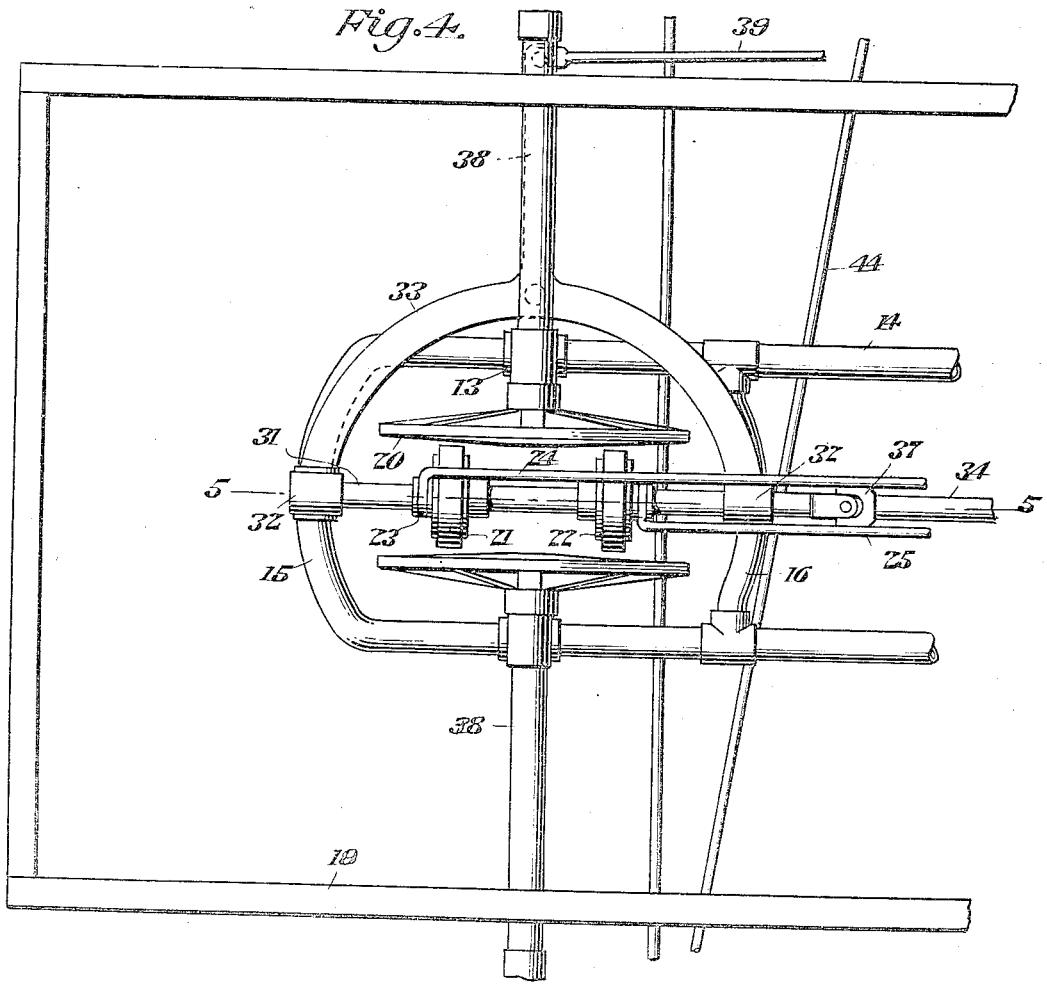
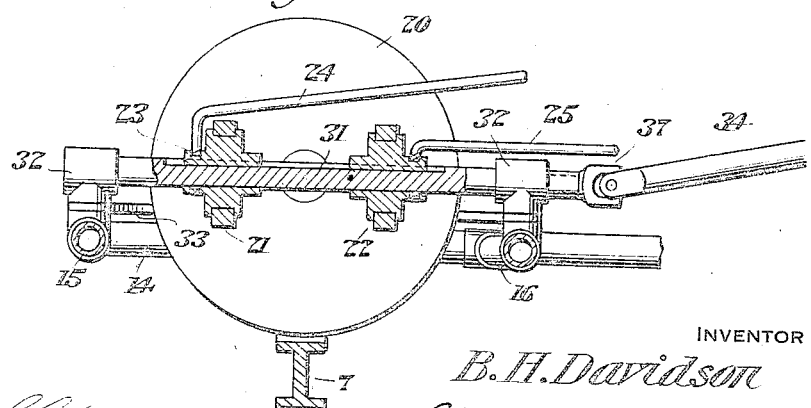

BENJAMIN H. DAVIDSON, OF TAMPA, FLORIDA, ASSIGNOR OF ONE-HALF TO W. H. KENDRICKS, OF HILLSBOROUGH COUNTY, FLORIDA.

FOUR-WHEEL DRIVE MECHANISM.

1,251,345.  Specification of Letters Patent.  Patented Dec. 25, 1917.

Application filed January 23, 1917. Serial No. 144,033.

*To all whom it may concern:*

Be it known that I, BENJAMIN H. DAVIDSON, a citizen of the United States, residing at Tampa, in the county of Hillsborough and State of Florida, have invented new and useful Improvements in Four-Wheel Drive Mechanism, of which the following is a specification.

This invention relates to four-wheel drive mechanism for motor trucks and motor vehicles generally, the main object of the invention being to provide in connection with each set of wheels combined driving and differential gearing of the friction type, each set of gears being coupled to the shaft of the motor, and having combined therewith means of a novel character for simultaneously and equally shifting the propeller shafts and the friction elements mounted thereon into and out of driving engagement with other friction elements on the shafts which drive the respective wheels, both sets of gears being controlled for movement into and out of operative position by a single lever within reach of the operator of the machine.

A further object of the invention is to provide means whereby both sets of adjustable friction gears may be thrown into operation to move the sets of friction gears into and out of operative position, combined with means for adjusting said sets of gears simultaneously for driving the vehicle in either direction, the construction being such that either end of the vehicle will serve as a front end.

A further object of the invention is to provide a motor vehicle of the character described which may be loaded from either end as well as steered from either end through the medium of steering controls operable from a central point on the machine, the construction being such that the vehicle when completing a run in one direction may be steered and controlled to run in the opposite direction so that the same course of travel may be retraced without the necessity of the driver turning the vehicle around.

With these and other objects in view, the invention consists of the features of construction, combination and arrangement of parts hereinafter fully described and claimed, reference being had to the accompanying drawings in which:—

Fig. 4 is a top plan view of one end of the truck with parts in section, on an enlarged scale.

Fig. 5 is a vertical longitudinal section on the line 5—5 of Fig. 4.

Figure 1:
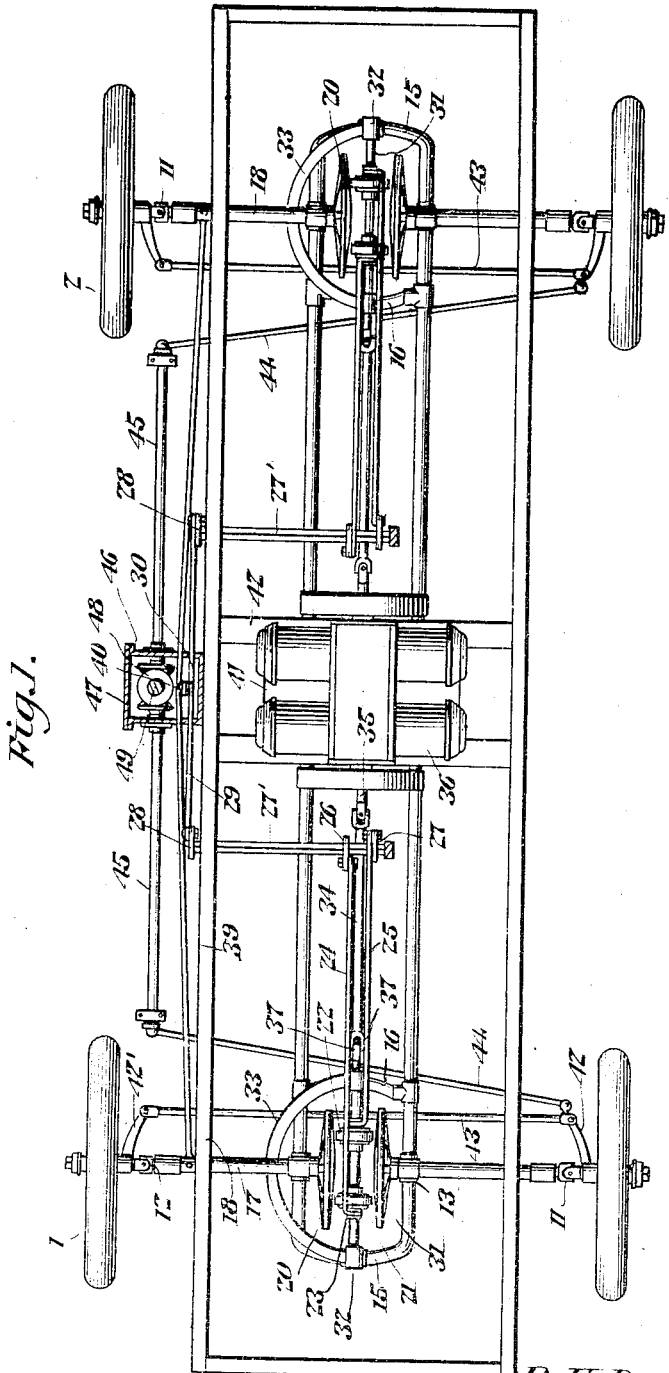
Figure 1 is a top plan view of the motor truck, showing the improved four-wheel drive mechanism.
Figure 2:
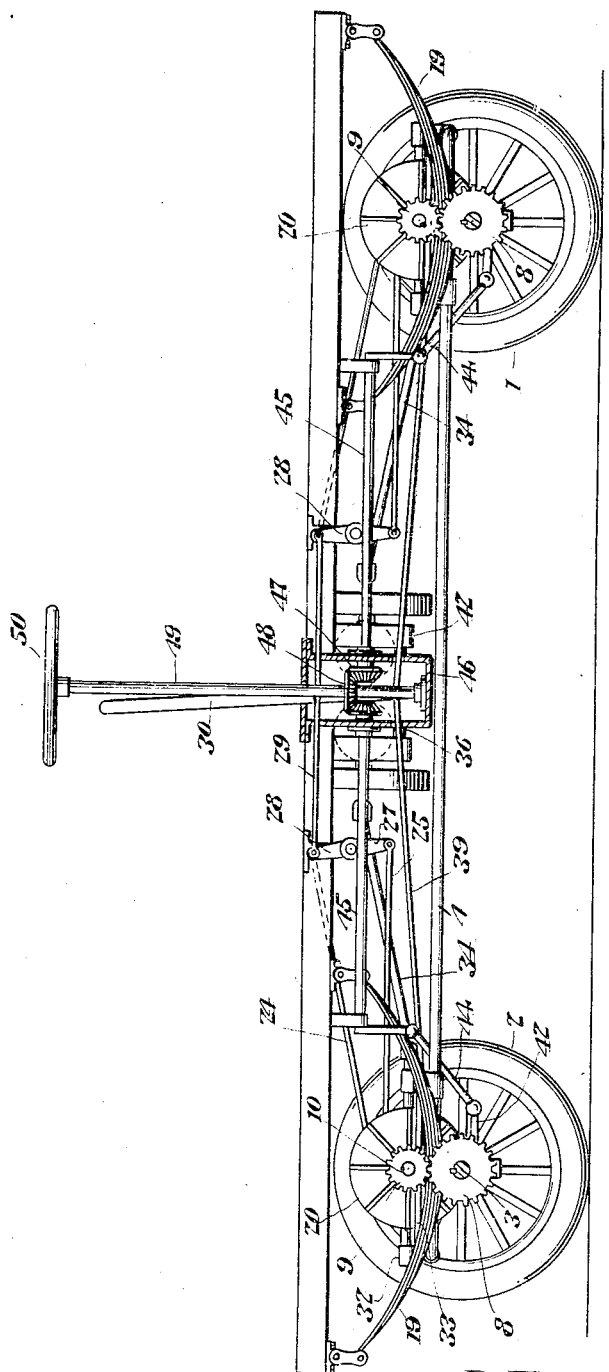
Fig. 2 is a side elevation of the same, with parts appearing in section.
Figure 3:
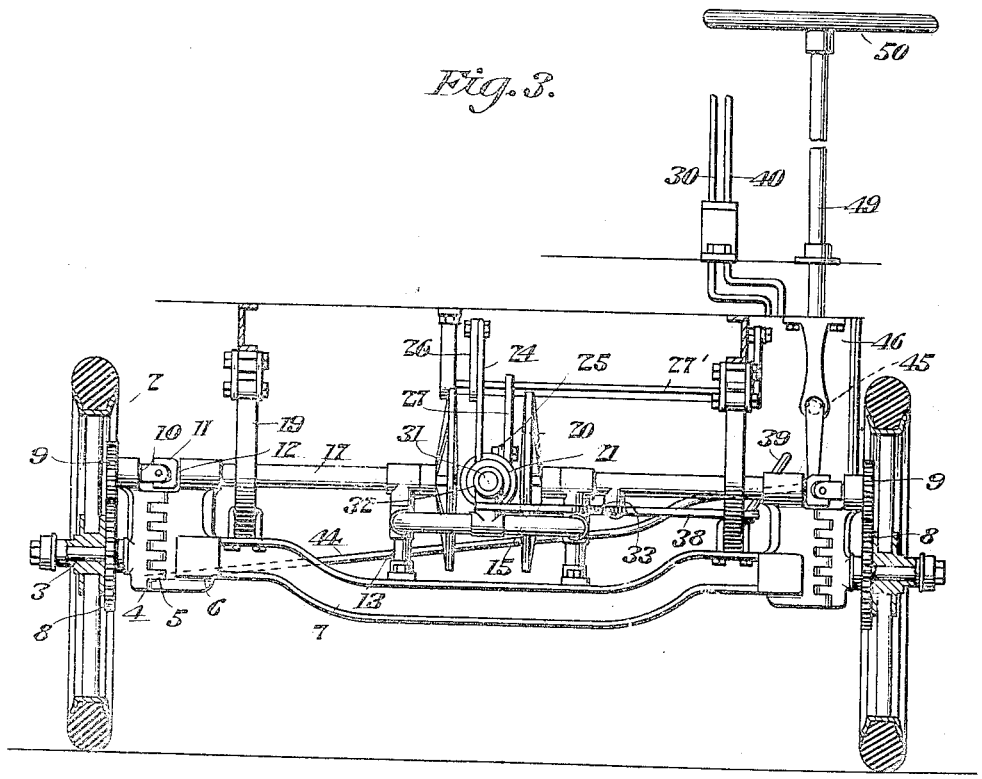
Fig. 3 is a rear end elevation of the motor truck, with parts appearing in section.
Figure 6:
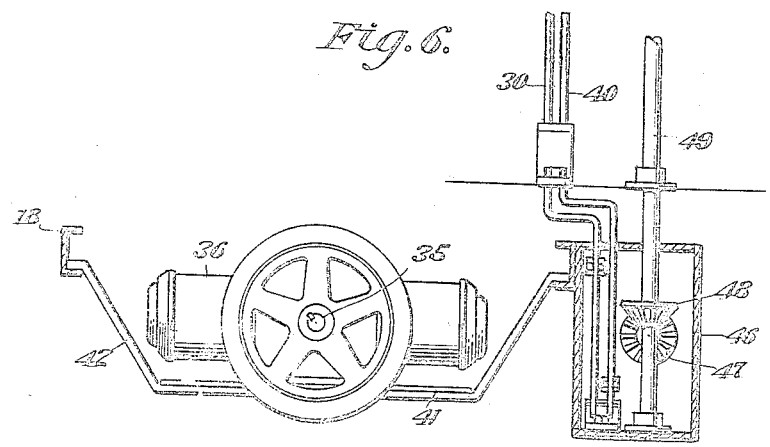
Fig. 6 is an enlarged sectional view showing the motor suspension.

Referring to the drawings, the numerals 1 and 2 designate the sets of wheels at the opposite ends of the truck, which are journaled upon axle spindles 3 carried by steering knuckles 4 coupled by hinged joints 5 to brackets 6 fixed to the ends of the axles 7. Fast upon the hub of each wheel is a gear 8 meshing with a gear pinion 9 on a stub shaft 10 journaled in a bearing upon the steering knuckle and connected by a universal joint 11 with the outer end of a transverse drive shaft 12 disposed above the axle. The axle 6 at each end of the vehicle is connected by hangers 13 with a reach or truss frame comprising parallel side bars 14, outer end bars 15 and cross pieces 16. Rigid with the truss frame thus constructed are tubes or sleeves 17 which form housings for the shafts 12, and which are spaced at their inner ends and connected with the end pieces 15 by the hangers 13. Disposed above the truss frame is a truck frame 18, which supports the body of the vehicle, which truck frame is mounted upon springs 19 carried by the axles. As shown the frame 18 consists of side and end bars and the side bars at least are preferably of channeled form.

Each shaft 12 is provided at its inner end with a friction disk 20, the friction faces of which are of tapered or conical form, having the greatest extent of projection at the center or axis and thence sloping rearwardly toward the periphery of the disks. Between the disks 20 are arranged two friction drive wheels 21 and 22, having grooved hubs 23 respectively engaged by the forked outer ends of shifting rods 24 and 25 connected at their inner ends with crank arms 26 and 27 projecting outwardly and inwardly at angles of equal degrees from a rock shaft 27 journaled upon a frame 18, the construction being such that when said shaft is rocked in one direction both drive wheels will be moved toward each other and consequently toward the centers of the disks 20 while when said shaft is rocked in the opposite direction both drive wheels will be moved away from each other or away from the centers of the disks. The two rock shafts 27 are provided with other crank arms 28 coupled by a connecting rod 29 with a control lever 30, whereby both sets of driving wheels may be simultaneously adjusted with relation to the peripheries of the friction disks, as will be readily understood. Hence it will be seen that both sets of drive wheels may be simultaneously shifted longitudinally of the vehicle into position with relation to the friction disks for high, low and intermediate speed driving actions.

The drive wheels 22 are feathered or splined to slide upon and rotate with propeller shafts 31 journaled in bearings 32 connected with the ends of a yoke 33, said bearings forming runners which embrace and slidably engage the end pieces 15, which are curved on the arc of a circle, so that the propeller shafts may be turned or adjusted laterally in either direction at will to adjust the wheels 21 and 22 into engagement with the disk 20 for a driving action to drive the wheels in one direction or the other. The propeller shafts 31 are connected by tumbling shafts 34 to the shaft 35 of the engine 36, the connection between each tumbling shaft and the engine shaft and the propeller shaft consisting of a combined universal and slip-joint, as shown at 37, thereby allowing for the relative up and down movement between the truck frame and the front and rear axles. The yoke levers 33 at the opposite ends of the machine are provided with lever arms 38, the lever arms of said yokes being coupled by a connecting rod 39 to an operating or equalizing lever 40, whereby said yoke levers may be simultaneously adjusted. Through the swinging movements of the yoke levers in one direction the propeller shafts 31 will be inclined in the same direction simultaneously, causing one of the friction wheels 21 of one set of gearing and the companion 21 of the other set of gearing to move into driving engagement with one of the adjacent friction disks, while the other friction wheel 22 of each set of gearing moves into driving engagement with the other friction disk. By moving the yoke levers in the opposite direction, the propeller shafts will be inclined in the reverse direction to that previously described, thus reversing the relation of the driving wheels to the friction disks for driving the machine in the reverse direction. This provides for driving the machine in either direction, with either end of the truck serving as the front end, whereby the operator after running in one direction may reverse his course without the necessity of turning the vehicle. A vehicle is thus provided which may be run in either direction at will and loaded from either end, and which thus affords greater convenience in loading and handling the same.

By the use of friction disks with conical or tapered surfaces, it will of course be understood that the proper engagement of the driving wheels 21 and 22 therewith when the propeller shafts are inclined is insured, and it will be seen that by sliding the wheels 21 and 22 inwardly or outwardly on the propeller shafts and inclining said shafts as desired, all of which may be accomplished by the operator from a fixed point on the machine, the friction drive gearing may be thrown into and out of action at will, adjusted for high, low or intermediate driving action, and also adjusted to reverse the direction of driving motion in a ready and convenient manner.

The motor 36 is shown in the present instance as mounted upon a bed 41 suspended by hangers 42 from the channel side bars of the truck frame. For the purpose of steering the vehicle, suitable steering mechanism may be provided, that shown in the present instance consisting of steering arms 42' projecting from each set of steering knuckles and coupled by a connecting rod 43, one of the arms of each set being pivotally coupled by the transverse connecting rod 44 with the outer end of a control shaft 45. The control shafts 45 are arranged in longitudinal alinement at one side of the frame and are journaled at their inner ends in a housing or casing 46 and provided with beveled gears 47 meshing with a similar gear 48 on a control shaft 49 provided with a hand wheel or other similar operating device 50, whereby the wheels at both ends of the machine may be simultaneously adjusted for steering actions, as will be readily understood.

I claim:—

1. In a motor vehicle, the combination of a frame, front and rear axles, steering knuckles on said axles, wheels journaled on said steering knuckles, a divided shaft parallel to each axle and geared to the wheels thereof, friction disks on the inner ends of the sections of said shafts, an engine, propeller shafts having a tumbling shaft connection with the engine shaft, a pair of friction wheels on each propeller shaft having a keyed and slidable mounting thereon, swivel bearings in which each propeller shaft is journaled, runners supporting said swivel bearings, guides for said runners extending transversely of the machine, yoke levers having a pivotal connection with said runners, an equalizing rod connecting said yoke levers for simultaneously operating the same, and means for shifting said equalizing rod.

2. In a motor vehicle, the combination of a frame, front and rear axles, steering knuckles on said axles, wheels journaled on said steering knuckles, a divided shaft parallel to each axle and geared to the wheels thereof, friction disks on the inner ends of the sections of said shafts, an engine, propeller shafts having a tumbling shaft connection with the engine shaft, a pair of friction wheels on each propeller shaft having a keyed and slidable mounting thereon, swivel bearings in which each propeller shaft is journaled, runners supporting said swivel bearings, guides for said runners extending transversely of the machine, yoke levers having a pivotal connection with said runners, an equalizing rod connecting said yoke levers for simultaneously operating the same, and means for shifting said equalizing rod, and stops for limiting the movement of said friction wheels away from each other.

In testimony whereof I affix my signature.

BENJAMIN H. DAVIDSON.